(12) United States Patent
Deutsch et al.

(10) Patent No.: US 6,768,589 B2
(45) Date of Patent: Jul. 27, 2004

(54) METHOD AND APPARATUS PROVIDING REDUCED POLARIZATION-DEPENDENT LOSS

(75) Inventors: Erik R. Deutsch, Cambridge, MA (US); Malcolm C. Smith, Charlton, MA (US)

(73) Assignee: Polychromix Corporation, Wilmington, MA (US)

( * ) Notice: Subject to any disclaimer, the term of this patent is extended or adjusted under 35 U.S.C. 154(b) by 0 days.

(21) Appl. No.: 10/329,014

(22) Filed: Dec. 23, 2002

(65) Prior Publication Data
US 2004/0027667 A1 Feb. 12, 2004

Related U.S. Application Data
(60) Provisional application No. 60/343,458, filed on Dec. 21, 2001.

(51) Int. Cl.[7] .................................................. G02B 5/18
(52) U.S. Cl. ................. 359/572; 359/291; 359/223; 359/566; 385/24; 398/81
(58) Field of Search .................. 359/291, 558, 359/223, 224, 572–574, 566; 385/24; 398/81

(56) References Cited

U.S. PATENT DOCUMENTS

| | | | |
|---|---|---|---|
| 5,757,536 A | 5/1998 | Ricco et al. | |
| 5,920,418 A * | 7/1999 | Shiono et al. | 359/246 |
| 5,999,319 A * | 12/1999 | Castracane | 359/573 |
| 6,144,481 A | 11/2000 | Kowarz et al. | |
| 6,169,624 B1 | 1/2001 | Godil et al. | |
| 6,172,796 B1 * | 1/2001 | Kowarz et al. | 359/290 |
| 6,188,519 B1 | 2/2001 | Johnson | |
| 6,268,952 B1 | 7/2001 | Godil et al. | |
| 6,421,160 B2 | 7/2002 | Ham | |
| 6,490,089 B1 * | 12/2002 | Fabiny | 359/571 |
| 2003/0035195 A1 | 2/2003 | Blech et al. | |
| 2003/0223116 A1 * | 12/2003 | Amm et al. | 359/572 |

OTHER PUBLICATIONS

Agilent Technologies, "Polarization Dependent Loss Measurement of Passive Optical Components", pp. 1–12.

* cited by examiner

Primary Examiner—Drew A. Dunn
Assistant Examiner—Leo Boutsikaris
(74) Attorney, Agent, or Firm—Lowrie, Lando & Anastasi, LLP

(57) ABSTRACT

A diffraction grating providing reduced polarization dependent loss. The elements of pixels of the diffraction grating are fixed or actuated such that some grating elements are actuated to correspond to a positive polarization dependent loss and others are actuated to correspond to a negative polarization dependent loss. The pixels may include multiples of three grating elements or multiples of four grating elements. An electrostatic beam structure providing increased actuation in a direction away from a substrate may be used in a diffraction grating providing reduced polarization dependent loss.

48 Claims, 9 Drawing Sheets

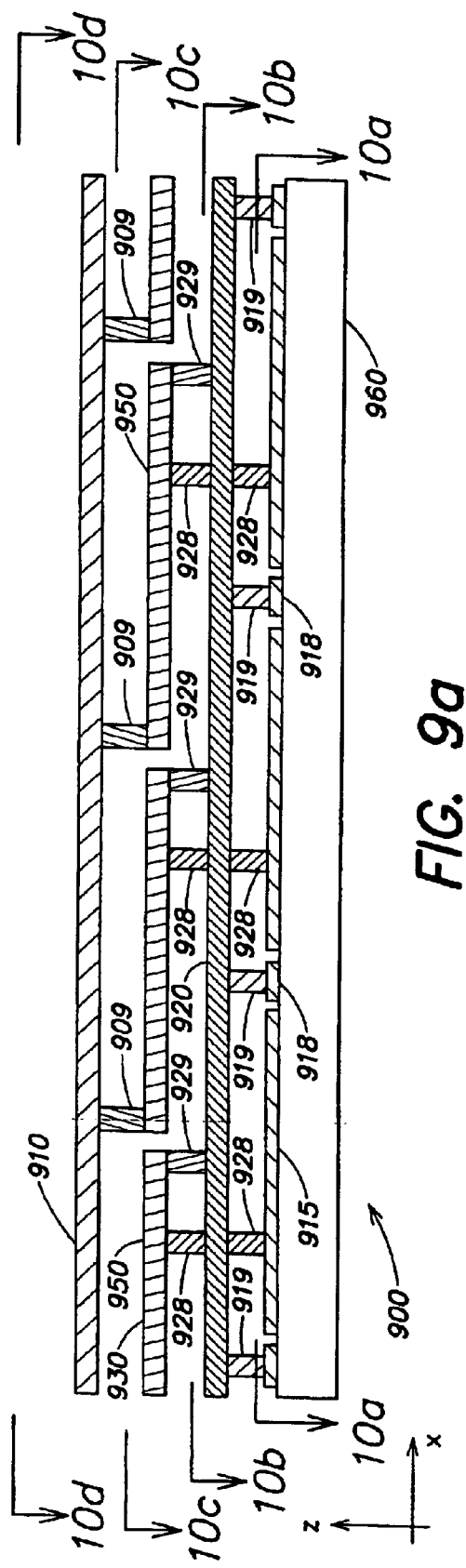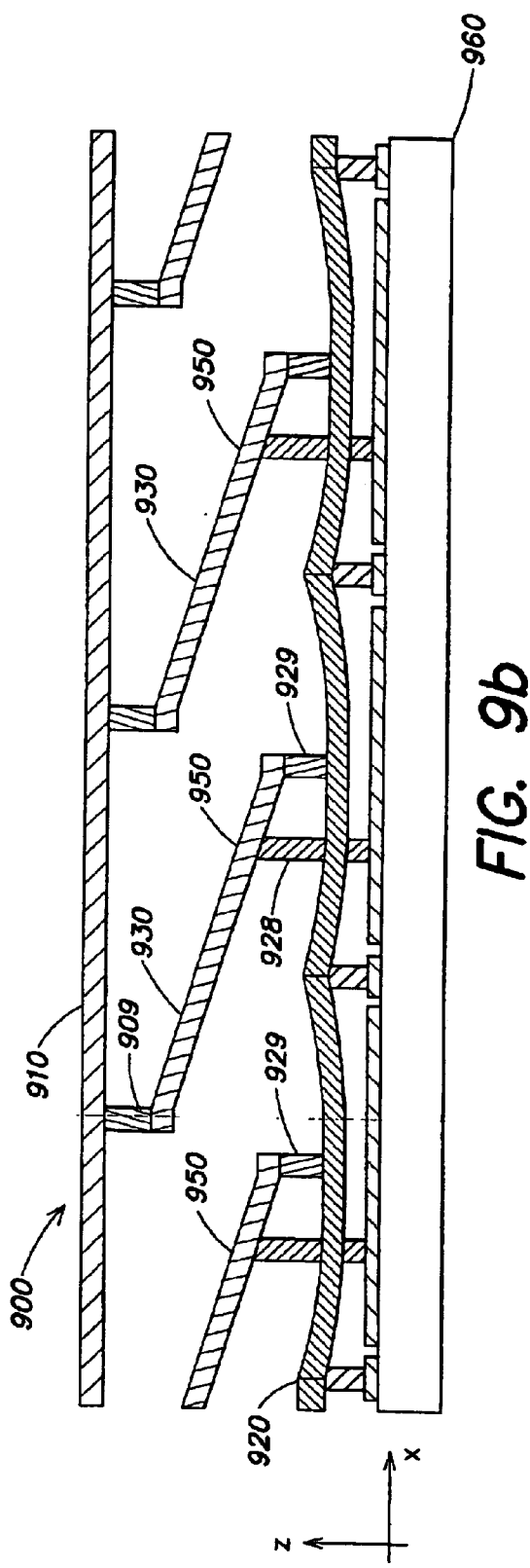
FIG. 9a
FIG. 9b

METHOD AND APPARATUS PROVIDING REDUCED POLARIZATION-DEPENDENT LOSS

RELATED APPLICATIONS

This application claims the benefit of U.S. Provisional Application No. 60/343,458 under 35 U.S.C. §119(e) filed Dec. 21, 2001, entitled "ACTUATABLE GRATING PROVIDING REDUCED POLARIZATION-DEPENDENT LOSS AND METHOD OF OPERATING AN ACTUATABLE GRATING," by Deutsch, et al. The entirety of the above provisional application is hereby incorporated by reference.

FIELD OF THE INVENTION

The present invention generally relates to actuatable diffraction gratings and more particularly, to actuatable diffraction gratings providing reduced polarization dependent loss.

BACKGROUND OF THE INVENTION

An important characteristic of desired for optical telecommunications components is that they have low polarization-dependent loss (PDL). PDL is defined as the degree to which an optical device attenuates an input signal as a function of polarization, commonly expressed in terms of a logarithm the ratio of the diffraction efficiency of transverse electric (TE) polarized light and transverse magnetic (TM) polarized light. Conventional diffraction gratings (i.e., one-dimensional gratings having a single elongate dimension) are intrinsically polarization-dependent devices. Accordingly, MEMS-based (i.e., made using microelectromechanical system manufacturing techniques) conventional diffraction gratings have suffered from significant PDL.

Modifications to MEMS-based diffraction gratings have been made to reduce PDL. One such modification involves using wider elements, either for the entire grating or by making selected grating elements wider. Such modifications provide reduced PDL at a specific actuation state of the MEMS grating, but do not provide significant reduction of PDL over all actuation depths. Additionally, the use of wider grating elements results in larger devices, and smaller diffraction angles. Both of these drawbacks have led to increased package size for devices employing gratings that have been so modified.

An example of a diffraction grating design having equal diffraction efficiency for TE-polarized light and TM-polarized light (i.e., a PDL of zero) is a bi-grating. A bi-grating is a two-dimensional grating which diffracts light in two orthogonal planes. The grating described in U.S. Pat. No. 6,188,519 B1, to Johnson, issued Feb. 13, 2001 is an example of a MEMS-based bi-grating for use in maskless lithography and high resolution printing. The device described in Johnson requires an actuatable membrane and fixed islands, which are difficult to fabricate. Furthermore, when the device described in Johnson is actuated, the membrane is not flat, resulting in a reduction in diffraction efficiency.

SUMMARY OF THE INVENTION

Some aspects of the present invention apply a recognition that in an actuatable, one-dimensional diffraction grating, the PDL contribution caused by two grating elements is a function of the relative displacement of the two grating elements (i.e., the gap size; gap size is defined as separation in the z-direction, as illustrated in FIG. 2a); and a further recognition that PDL as a function of displacement has regimes of positive and negative PDL (see FIG. 1). Each grating element of a diffraction grating has a reflective surface that is either integrated with the grating element (i.e., the grating elements is made of a reflective material) or has a reflective surface otherwise disposed on the grating element. The size of a gap is measured between the tops of the reflective surfaces of the relevant grating elements.

Accordingly, by processing light of a channel (e.g., a signal having a single wavelength of light) with a diffraction grating configured such that one or more regions of the grating correspond to a positive PDL (i.e., the relative displacement of at least two grating elements within the grating corresponds to greater throughput efficiency for TE-polarized light than TM-polarized light) and one or more regions correspond to a negative PDL (i.e., the relative displacement of at least two elements within the grating correspond to greater throughput efficiency for TM-polarized light than TE-polarized light L), the overall PDL of the light processed by the grating can be reduced relative to a conventional diffraction grating in which all regions of the diffraction grating correspond to a PDL of the same sign (i.e., all positive or all negative).

One aspect of the present invention is directed to a diffraction grating optical processor having one or more groups of grating elements, each group including three or more grating elements that function together to process light of a channel in a manner that provides reduced PDL relative to a conventional diffraction grating.

The grating elements processing light of a single channel are referred to herein as a "pixel." It is to be understood that it is the aggregate effect of the positioning of all the grating elements of a pixel (i.e., the relative displacements of all grating elements relative to one another) that determines the amount of PDL present in a signal processed by a pixel. However, it is instructive and convenient to ascribe a PDL to individual pairs of grating elements comprising a pixel (e.g., a reference grating element, typically a non-actuatable grating element, and an operational grating element, typically an actuatable grating element); the sum of the PDLs ascribed to the pairs of grating elements are indicative of the PDL for the entire pixel. When referring to the PDL contribution of a pair of grating elements of a pixel (as determined by the gap therebetween), the arrangement will be said "to correspond to a PDL."

Embodiments of actuatable gratings as taught herein may have pixels including a plurality of adjacent actuatable grating elements. Accordingly, gaps (in the z-direction) may be defined between one or more operational grating elements of a pixel and a non-adjacent reference grating element. The gaps in such devices may correspond to positive and negative PDLs, so as to reduce the overall PDL of a pixel (e.g., see FIG. 8).

The present invention also includes, but is not limited to, embodiments of actuatable diffraction gratings that provide reduced PDL over all actuation depths. The phrase "all actuation depths" means including actuation distances equal to at least one quarter of a processed wavelength of light, such that a selected amount of diffraction achieved by a given pixel of the diffraction grating may range from zero diffraction (i.e., substantially all of the light reflecting from the pixel remains in the zeroth order) to complete diffraction (i.e., substantially all of the light reflecting from the pixel is diffracted out of the zeroth order).

A first aspect of the invention is directed to an optical processor characterized by an axis extending in a direction, the optical processor comprising: (a) a pixel to process light having a wavelength λ, comprising (1) a first grating element having a reflective surface, at least a portion of the reflective surface being disposed normal to a direction of the axis, (2) a second grating element, parallel to the first grating element and having a reflective surface, at least a portion of the reflective surface being disposed normal to the direction of the axis, and (3) a third grating element, parallel to the first grating element and having a reflective surface, at least a portion of the reflective surface being disposed normal to the direction of the axis; and (b) a controller operable to displace at least the reflective surface of the second grating element relative the reflective surface of the first grating element, a displacement of the reflective surface of the second grating element forming a first gap in the direction of the axis relative the reflective surface of the first grating element, the first gap corresponding to a PDL of a sign, and the reflective surface of the third grating element forming a second gap, relative one of the reflective surface of the first grating element and the reflective surface of the second grating element, in the direction of the axis and corresponding to a PDL of the opposite sign.

In some embodiments, in a direction perpendicular to the axis, the second grating element is located intermediate the first grating element and the third grating element. In some embodiments, the first grating element and the third grating element are non-actuatable grating elements. The reflective surface of the first grating element and reflective surface of the third grating element may be separated by a distance, in the direction of the axis, equal to an integer multiple of λ/2. Optionally, the width of the reflective surface of the second grating element is equal to the sum of the widths of the reflective surface of the first grating element and the reflective surface of the third grating element. The PDL of a sign and the PDL of an opposite sign may have substantially the same magnitudes, whereby their sum is substantially zero. The terms "substantially zero" is defined herein to mean less than 0.2 dB. The controller may be operable to displace the third grating element relative the first grating element, and in a direction perpendicular the axis, the first grating element is located intermediate the second grating element and the third grating element.

In other embodiments, the controller is operable to maintain the reflective surface of the second grating element and reflective surface of the third grating element in positions separated by a distance, in the direction of the axis, equal to an integer multiple of λ/2 during processing of the light, and wherein the controller is operable to displace the second grating element and the third grating element relative the first grating element during the processing of the light. In still other embodiments, the controller may be operable to displace the first grating element, and the third grating element. In some embodiments, in a direction perpendicular the axis, the first grating element is located intermediate the second grating element and the third grating element, and wherein the controller is operable to maintain the reflective surface of the second element and reflective surface of the third grating element in positions separated by a distance, along the axis, equal to an integer multiple of λ/2 during processing of the light, and to displace the reflective surface of the first grating element while the reflective surface of the second grating element and the reflective surface of the third element are maintained in said position. In such embodiments, the width of the reflective surface of the first grating element is equal to the sum of the widths of the reflective surface of the second grating element and the reflective surface of the third grating element. The PDL of a sign and the PDL of an opposite sign may have substantially the same magnitudes, whereby their sum is substantially zero.

In some embodiments, the pixel further comprises a fourth grating element, parallel to the first grating element and having a reflective surface, at least a portion of the reflective surface normal to the direction of the axis, and wherein, in a direction normal to the axis, the grating elements are arranged in the following order, the first grating element, the second grating element, the fourth grating element and the third grating element. The first grating element and the fourth grating element may be non-actuatable. The first grating element and the fourth grating element may be coplanar with one another. Optionally, the controller is operable to displace the second grating element and the third grating element, and wherein the PDL of a sign and the PDL of an opposite sign have substantially the same magnitudes, whereby their sum is substantially zero. The controller may be operable to maintain the reflective surface of the first grating element and the reflective surface of the fourth grating element in coplanar positions during processing of the light. The controller may be operable to displace the second grating element and the third grating element relative the first grating elements and the fourth grating element, and wherein the PDL of a sign and the PDL of an opposite sign have substantially the same magnitudes, whereby the sum of the PDL of a sign and the PDL of the opposite sign is substantially zero.

In some embodiments, the reflective surface of the first grating element and the reflective surface of the fourth grating element may be non-actuatable, and separated by an integer multiple of λ/2 along the axis. In such embodiments, the controller may be operable to displace the reflective surface of the second grating element and the reflective surface of the third grating element during processing of the light, and wherein the PDL of a sign and the PDL of an opposite sign have substantially the same magnitudes during the processing of the light, whereby their sum is substantially zero.

In some embodiments, the pixel further comprises a fourth grating element, parallel to the first grating element and having a reflective surface, at least a portion of the reflective surface normal to the direction of the axis, and wherein, in a direction normal to the axis, the grating elements are arranged in the following order, the first grating element, the fourth grating element, the second grating element and the third grating element. Optionally, the second grating element and the third grating element are connected together such that reflective surface of the second grating element and the reflective surface third grating element are separated by a distance equal to an integer multiple of λ/2 in the direction of the axis. The controller may be operable to displace the second grating element and third grating element along the axis, relative the first grating element and the third grating element, whereby the distance is maintained during displacement. The reflective surface of the first grating element and the reflective surface of the fourth grating element may be connected together such that reflective surface first grating element and the reflective surface of the fourth grating element are separated by a distance equal to an integer multiple of λ/2 in the direction of the axis.

The displacement in any of the above embodiments may be achieved using one of an electrostatic technique, a magnetic technique, a piezoelectric technique, and a thermal technique.

Another aspect of the invention is directed to an optical processor to process light having a wavelength λ, characterized by an first axis extending in a direction, the optical processor comprising: a first grating element having a length and a reflective surface, at least a portion of the reflective surface being disposed normal to a direction of the axis; a second grating element, parallel to the first grating element and having a reflective surface, at least a portion of the reflective surface being disposed normal to the direction of the first axis, the second grating element connected to the first grating element such that in the direction of a second axis, which is perpendicular to both the length and the first axis, there is a first step equal in height to a non-zero integer multiple of $\lambda/4$ between the reflective surface of the first grating element and reflective surface of the second grating element; a third grating element having a reflective surface, at least a portion of the reflective surface being disposed normal to a direction of the first axis; and a fourth grating element, parallel to the first grating element and having a reflective surface, at least a portion of the reflective surface being disposed normal to the direction of the first axis, the fourth grating element connected to the third grating element such that in the direction of the second axis there is a second step equal in height to a non-zero integer multiple of $\lambda/4$ between the reflective surface of the third grating element and reflective surface of the fourth grating element, the first grating element and the second grating element displaceable relative the third grating element and the fourth grating element, in the direction of the first axis; whereby the first step and the second step are maintained in both actuated state and the unactuated state. The optical processor may further comprise an actuator to effect a displacement of the first grating element and the second grating element relative the third grating element and the fourth grating element, in the direction of the first axis. In an unactuated state, the reflective surface of the first grating element may be coplanar with the reflective surface of the third grating element, and the reflective surface of second grating element is coplanar with the reflective surface of the fourth grating element. The actuator may be one of an electrostatic actuator, a magnetic actuator, a piezoelectric actuator, and a thermal actuator.

Still another aspect of the invention is an optical processor to process light having a wavelength $\lambda$, characterized by an first axis extending in a direction, the optical processor comprising: a first grating element having a reflective surface, at least a portion of the reflective surface being disposed normal to a direction of the axis; a second grating element, parallel to the first grating element and having a reflective surface, at least a portion of the reflective surface being disposed normal to the direction of the first axis, the second grating element having a structurally fixed separation from the first grating element, along the first axis, equal to a non-zero integer multiple of $\lambda/4$; and a third grating element having a reflective surface, at least a portion of the reflective surface being disposed normal to a direction of the first axis, the third grating element displaceable relative the first grating element and second grating element.

The optical processor may further comprise an actuator to effect a displacement of the first grating element and the second grating element relative the third grating element, in the direction of the first axis. Optionally, the first grating element and the second grating element are non-actuatable. In some embodiments, in a direction perpendicular the axis, the third grating element is located intermediate the first grating element and the second grating element. The width of the reflective surface of the third grating element may be equal to the sum of the widths of the reflective surface of the first grating element and the reflective surface of the second grating element. The gap between the reflective surface of the first grating surface and the reflective surface of the third grating element, in the direction of the axis, may correspond to a PDL of a sign, and the gap between the reflective surface of the second grating element and the reflective surface of the third grating element, in the direction of the axis, may correspond to a PDL of the opposite sign, the PDL of a sign and the PDL of the opposite sign have substantially the same magnitudes, whereby their sum is substantially zero.

Yet another aspect of the invention is directed to an optical system comprising (a) an optical source to produce a wavelength $\lambda$; and (b) a fixed diffraction grating characterized by an axis extending in a direction, the diffraction grating comprising a pixel configured to receive the wavelength $\lambda$, comprising (1) a first grating element having a reflective surface, at least a portion of the reflective surface being disposed normal to a direction of the axis, (2) a second grating element, parallel to the first grating element and having a reflective surface, at least a portion of the reflective surface being disposed normal to the direction of the axis, the reflective surface of the second grating element forming a first gap in the direction of the axis relative the reflective surface of the first grating element, the first gap corresponding to a PDL of a sign and
(3) a third grating element, parallel to the first grating element and having a reflective surface, at least a portion of the reflective surface being disposed normal to the direction of the axis, the reflective surface of the third grating element forming a second gap, relative one of the reflective surface of the first grating element and the reflective surface of the second grating element, in the direction of the axis and corresponding to a PDL of the opposite sign.

A fourth aspect of the invention is a method of operating a pixel of an optical processor, characterized by an axis, the pixel having (a) a first grating element having a reflective surface supported above a substrate, at least a portion of the reflective surface normal to a direction of the axis, (b) a second grating element having a reflective surface supported above a substrate, at least a portion of the reflective surface normal to the direction of the axis, and (c) a third grating element having a reflective surface, a portion of the reflective surface normal to the direction of the axis, comprising: positioning the reflective surface of the second grating element to form a first gap relative the reflective surface of the first grating element, the first gap corresponding to a PDL of a sign, the reflective surface of the third grating element forming a second gap relative one of the reflective surface of the first grating and the reflective surface of the second grating, the second gap corresponding to a PDL of the opposite sign. The PDL of a sign and the PDL of an opposite sign may have substantially the same magnitudes, whereby their sum is substantially zero. Optionally, the step of positioning includes increasing the first gap and decreasing the second gap. Alternatively, the step of positioning includes increasing the first gap and increasing the second gap.

In some embodiments, the pixel further comprises a fourth diffractive grating element having a reflective surface, at least a portion of the reflective surface normal to the direction of the axis, the method further comprising positioning the reflective surface of the third grating element such that the second gap corresponds to a PDL having the opposite sign.

The pixel may have a baseline position, and wherein the step of positioning the reflective surface of the second grating element includes moving away from the baseline position and toward the substrate, and the step of positioning reflective surface of the grating element includes moving away form the baseline position and away from the substrate. Alternatively, the pixel has a baseline position, and wherein the step of positioning the reflective surface of the second grating element includes moving away from the baseline position and toward the substrate, and the step of positioning reflective surface of the third grating element includes moving away form the baseline position and toward the substrate.

The step of positioning the reflective surface of the second grating element may increase the first gap and the step of positioning the reflective surface of the third grating element decreases the second gap. Alternatively, the step of positioning the reflective surface of the second grating element may be achieved using one of an electrostatic technique, a magnetic technique, a piezoelectric technique, and a thermal technique.

BRIEF DESCRIPTION OF THE DRAWINGS

Illustrative, non-limiting embodiments of the present invention will be described by way of example with reference to the accompanying drawings, in which the same reference number is used to designate the same components in different figures, and in which:

FIG. 9a is a cross-sectional side view of an embodiment of an unactuated, electrostatically-actuated diffraction grating according to at least some aspects of the invention;

FIG. 9b is a cross-sectional view of the optical processor of FIG. 9a in an actuated state;

DESCRIPTION OF THE INVENTION

Figure 1:
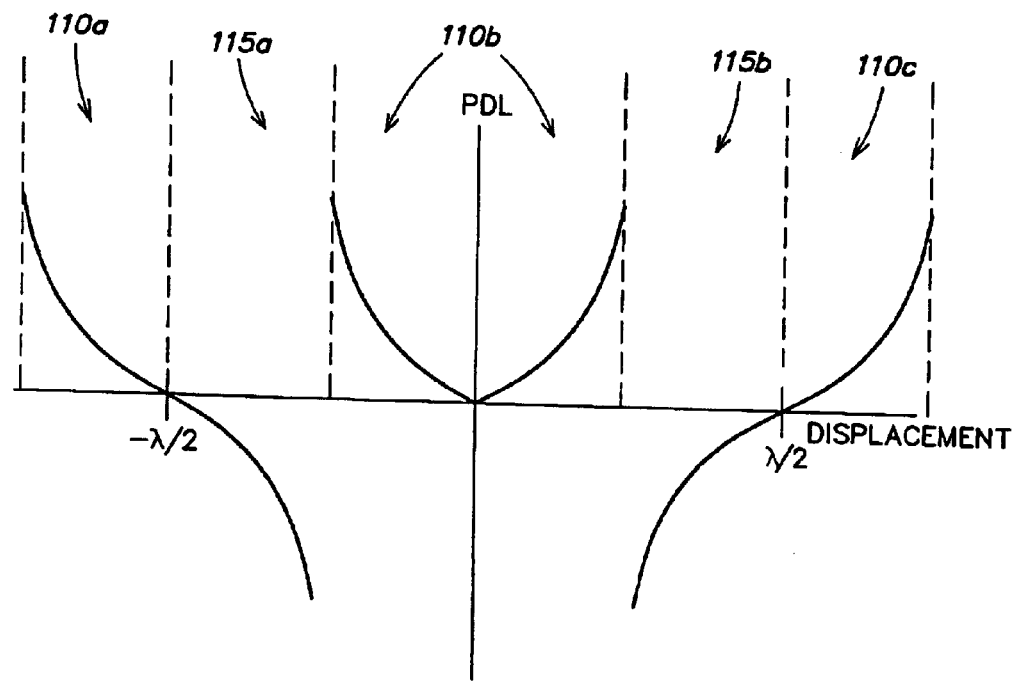
FIG. 1 is a graphical representation of PDL, as a function of displacement (i.e., gap size in the z-direction), for one pixel of a conventional optical processor.

FIG. 1 is a graphical representation of PDL, as a function of displacement (i.e., gap size in the z-direction), for one pixel of a conventional optical processor in which all gratings elements are operated to correspond to a PDL of the same sign. The graphical representation of FIG. 1 corresponds to actuation of a pixel having twelve grating elements, in which every other grating element is displaced an equal distance, in the same direction, along an axis whose direction is normal to a reflective surface of the grating elements, and the other elements remain stationary. By displacing the elements in such a manner, a gap is formed between actuated and stationary elements in the direction of the z-axis. In the graphical representation, PDL is expressed as $10 \log_{10} (TE_{Eff}/TM_{Eff})$, where $TE_{Eff}$ is the TE power output divided by TE power input for an optical processor and $TM_{Eff}$ is the TM power output divided by TM power input for the optical processor. Also, in the graphical representation, displacement is the distance between reflective surfaces of the displaced elements measured relative the surfaces of the stationary elements, in the direction of the z-axis, expressed as a fraction of the operational wavelength of light. The graphical representation was generated using the software package "G-solver" provided by the Grating Solver Development Co. of Allen, Tex.

For the presently described exemplary embodiment of a pixel, at zero displacement, all of the grating elements of the grating are coplanar. At zero displacement, the pixel behaves as a mirror, and maximum reflection of the zeroth order occurs. At an actuation distance of one-quarter wavelength (λ/4), where the maximum attenuation of the zeroth order reflected beam occurs, there is a discontinuity in the PDL. At displacements equal to an integer multiple of a half wavelength (other than zero displacement), the PDL changes sign, resulting in regimes of positive PDL (110a, 110b, 110c) and regimes of negative PDL (115a, 115b).

Figure 2A:
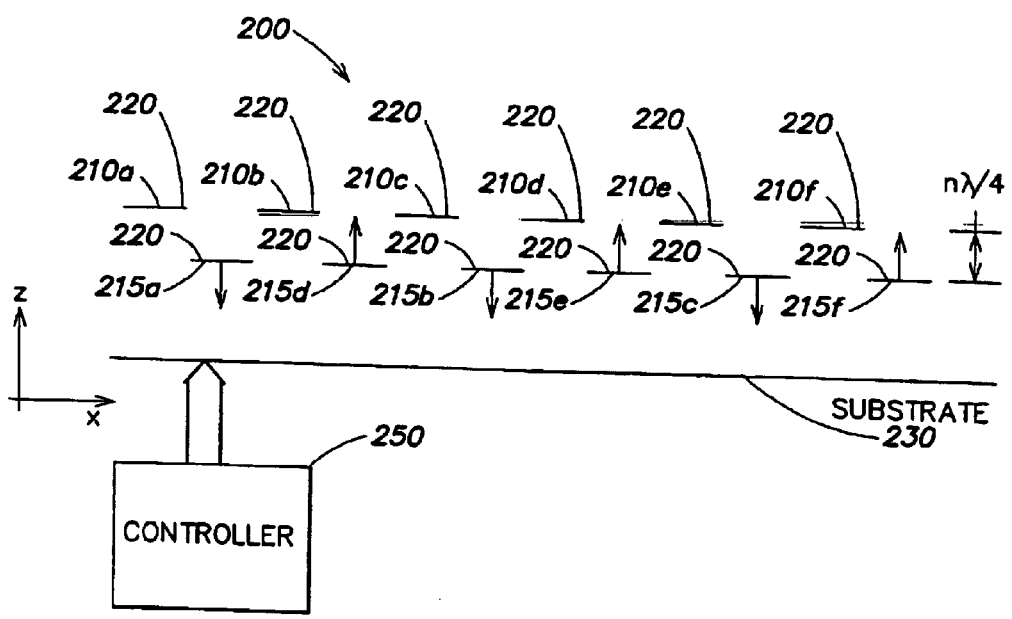
FIG. 2a is a schematic cross-sectional illustration of an exemplary embodiment of an optical processor according to at least some aspects of the present invention.

FIG. 2a is a schematic cross-sectional illustration of an exemplary embodiment of an optical processor 200 according to at least some aspects of the present invention. Optical processor 200 has one pixel including twelve grating elements: six reference grating elements 210a–f (collectively indicated to as reference grating elements 210) and six operational grating elements 215a–f (collectively referred to as operational gratings elements 215), each having a corresponding reflective surface 220. Optical processor 200 takes advantage of the regimes of positive PDL and negative PDL to maintain a reduced PDL over the whole actuation range, by positioning operational grating elements 215 at actuation distances corresponding to both positive and negative PDL values (i.e., the operational grating elements 215 are divided into a first group 215a–c and a second group 215d–f which are operated symmetrically about a displacement equal to an integer multiple of one-quarter wavelength (λ/4) to achieve a selected amount of diffraction).

Optical processor 200 may be used with any suitable source. In some embodiments, a source may provide wavelengths in telecommunications bands having wavelengths 820 nm–1620 nm. For example, the wavelengths may be in the C-band (1520 nm–1560 nm), the L-band (1561 nm–1720 nm) or in the band 820 nm–900 nm.

Although optical processor 200 is illustrated as having one pixel, it is to be appreciated that optical processors having any number of pixels are within the scope of this disclosure, one or more of which are operated to reduce PDL. For example, each pixel of an optical processor may process one spatially-separated channel of a wavelength division multiplexed (WDM) signal.

To operate grating elements 215 symmetrically about a displacement equal to an integer multiple of one-quarter wavelength (λ/4), the grating elements are first divided into a group of reference grating elements 210a–f and a group of operational grating elements 215a–f. In the illustrated embodiment, reference grating elements 210a–f are coplanar with one another and are parallel to the operational grating elements 215a–f. Reference grating elements are defined as those that remain stationary during processing of light, and operational grating elements are defined as those that are moved relative to the reference grating elements to achieve a given amount of diffraction.

In FIG. 2a, grating elements 210, 215 are at a baseline position, at which the reference grating elements 210 and the operational grating elements 215 are separated by a gap equal to λ/4 in the direction of the z-axis. A baseline position (also referred to herein simply as a baseline) is defined as a position for which either zero diffraction or maximum diffraction of the zeroth order of light occurs. The direction of the z-axis is normal to at least a portion of grating elements 210, 215.

Figure 2B:
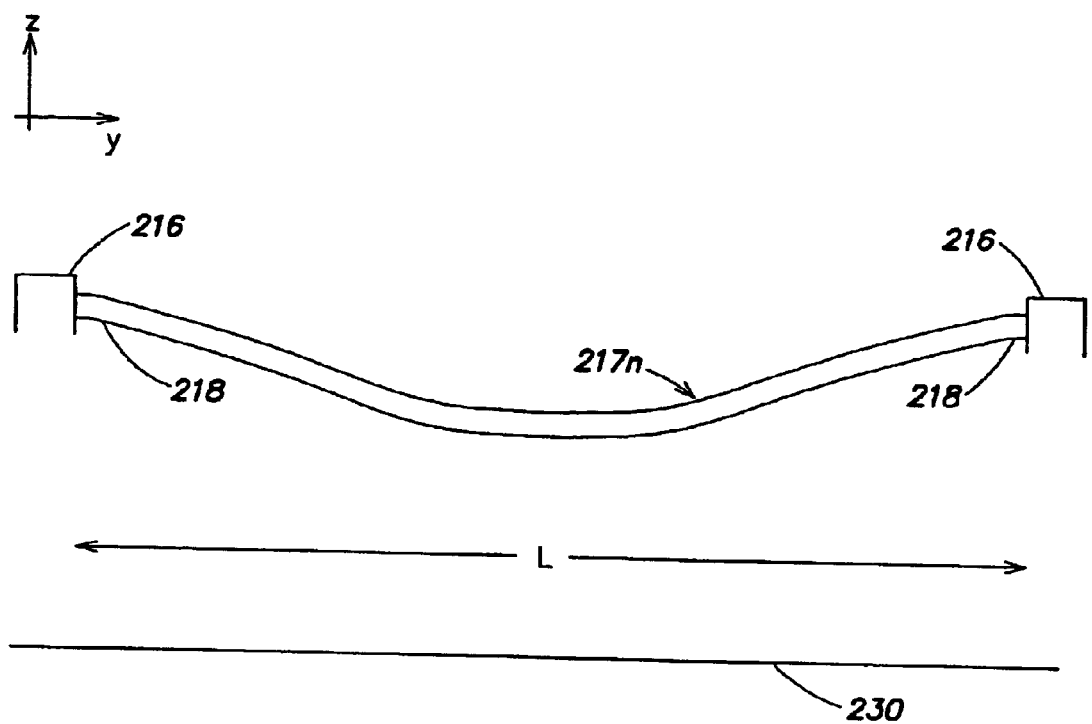
FIG. 2b is a side view of an exemplary grating element of an optical processor for which only a portion of the grating element is normal to the z-axis.

FIG. 2b is a side view of an exemplary grating element 217n (e.g., one of grating elements 210a–f, 215a–f in FIG. 2a) showing that only a portion of the grating element is normal to the z-axis. In the illustrated embodiments, grating element 217n is rigidly mounted on its ends 218, such that the ends do not move upon actuation of the grating element (e.g., a frame 216 is connected to ends 218 to support grating element 217n above substrate 230). Accordingly, grating element 217n bends such that only a portion of the grating element is normal to the z-axis. Such bending may limit the ability to maintain a precise gap, along length L, between neighboring grating element (i.e., grating element 217n and one of grating elements 210a–f), and thereby limit the portion of length L that is useable for processing light. It is to be appreciated that while a reference grating remains stationary during processing of light, the reference grating elements may be actuated to reach a baseline position, and therefore may suffer from the above limitation.

While the ends 218 may be connected to a frame as illustrated, it is to be appreciated that the invention is not so limited. For example, the teachings of the present invention may be applied to gratings having ends that are not connected to a frame (i.e., they are free-standing), such as those described in U.S. Pat. No. 6,329,738, issued to Hung et al., on Dec. 11, 2001, entitled "Precision Electrostatic Actuation and Positioning."

Referring again to FIG. 2a, the operational grating elements 215a–f are coupled to a controller 250 such that they form two groups: a first group (215a–c, indicated by a down arrow) and a second group (215d–f, indicated by an up arrow). The first group affects an increase in diffraction of light incident on the optical processor by increasing the actuation distance relative to the baseline position, to form a gap in the direction of the z-axis corresponding to a positive PDL regime. The second group affects an increase in diffraction of light incident on the optical processor by decreasing the actuation distance relative to the baseline position, to form a gap in the direction of the z-axis corresponding to a negative PDL regime.

It is to be appreciated that the reference grating elements may be acutuatable (i.e., moveable) or fixed. A fixed grating element need not be coupled to controller 250. A reference grating coupled to controller 250 is maintained stationary during processing of light. It should also be appreciated that the reference grating elements need not be coplanar with one another; they may be separated by any multiple (including zero) of a half-wavelength of the relevant light.

By operatively coupling the first group of operational grating elements and the second group of operational grating elements to controller 250 in the above-described manner, a given amount of diffraction of light projected onto the optical processor can be achieved by moving the operational grating elements from the baseline position. The above-described coupling results in reflected and diffracted portions of the projected light having a PDL that is reduced from the amount of PDL that would occur if the optical processor were operated in the conventional manner. That is, the PDL is reduced from the amount of PDL that would occur if the optical processor were operated in a manner in which a given amount of diffraction were achieved by moving all of the operational grating elements in a pixel in the same direction (i.e., either all upward or all downward relative to the baseline, such that all of the grating elements in a pixel are operated to form gaps corresponding to a positive PDL regime or all elements were operated to form a gaps corresponding to a negative PDL regime).

It is to be appreciated that, although the present embodiment is illustrated with twelve grating elements in a pixel, pixels according to the present embodiment could be achieved by using any multiple of four grating elements. The actual number of grating elements used is dependent on design constraints, including the spot size of the light to be projected on the optical processor.

In an embodiment of pixels having four grating elements, two are reference grating elements, and two are operational elements; one of the operational elements is operated to form a gap (relative to a reference grating element) corresponding to a positive PDL regime, and one of the operational elements is operated to form a gap (relative the reference grating element) corresponding to a negative PDL regime.

In some embodiments, the operational areas of the grating elements are selected to be equal. Accordingly, in such embodiments, equal displacements of the gratings operating the positive regime and the grating elements operating in the negative regime result in a pixel ideally producing zero PDL. The operational area is typically determined by the size of the beam of light projected onto the grating element and the width of the grating element.

The optical processors described above may be achieved using any suitable actuation technique (e.g., electrostatic, magnetic, piezoelectric or thermal). For embodiments of the optical processor in FIG. 2 that are actuated using a conventional electrostatically-actuated structure, increased actuation of a grating element arises from an increased attractive force which can only displace the grating element in the direction of the substrate 230 (where it is understood that the grating elements and the substrate have the structure to generate the charge necessary to provide the electrostatic force). Examples of conventional electrostatically actuated structures are disclosed in copending application Ser. No. 09/975,169, entitled Actuatable Diffractive Optical Processor, to E. Deutsch et al.

Some embodiments of optical processors according to the present invention, which use conventional electrostatic actuation techniques, are formed using diffraction gratings having grating elements which are coplanar in an unactuated state. In such embodiments, every other grating element may be actuated to achieve a baseline actuation distance of $\lambda/4$ as illustrated in FIG. 2a. The operational grating elements are then operated to form two interleaved groups; as described above, one group is further actuated to increase the total actuation distance beyond the baseline by an amount $\delta$, and a second group has its actuation distance decreased from that of the baseline by an amount $\delta$. Accordingly, both groups provide the same amount of diffraction, but correspond to PDLs having opposite signs. The result is a decrease in reflected light (i.e., a decrease of light in the zeroth order), and an increase in diffracted light (i.e., an increase of light in the first and higher orders), while providing a PDL reduced from that of a conventional grating operated in a conventional manner. While, the baseline positioning of the grating elements may be achieved by actuation of a diffraction grating having coplanar grating elements as just described; alternatively, a diffraction grating may be produced such that the diffraction grating is in the baseline position in an unactuated state.

It is to be appreciated that for other diffraction gratings in which actuation techniques other than electrostatic techniques are utilized (e.g., magnetic actuation, piezoelectric actuation or thermal actuation), it is possible to actuate grating elements in a manner that allows both an increase and/or decrease in actuation distance from the unactuated state (i.e., using attractive, as well as repulsive forces).

In an electrostatically-actuated embodiment of optical processor 200, controller 250 may be any controller capable of generating an electrostatic force necessary to achieve a given amount of actuation. Accordingly, controller 250 may be used to operate the individual grating elements in positive or negative PDL regimes in accordance with the above description. The voltages necessary to achieve specific displacements are discussed in greater detail in U.S. Pat. No. 6,329,738, issued to Hung et al., on Dec. 11, 2001, entitled "Precision Electrostatic Actuation and Positioning," which was incorporated by reference herein above. It is to be appreciated that the number of independent voltages to be generated by controller 250 is dependent on the number of gratings elements, pixels, and the structure of the optical processor to be controlled. In some embodiments, the operational grating elements may be electrically coupled together such that a single signal may be provided to operate multiple grating elements.

In a magnetically-actuated embodiment of optical processor 200, controller 250 is any controller capable of generating signal to achieve a magnetic force necessary to achieve a given level of actuation, to operate the individual grating elements in positive or negative PDL regimes in accordance with the above description. For example, the magnetic techniques as described in U.S. Pat. No. 6,088,148, to Furlani, et al. entitled "Micromagnetic Light Modulator," may be employed. It is to be appreciated that in a magnetically-actuated optical processor, actuation using an attractive force or a repulsive force can be achieved.

In piezoelectrically or thermally actuated embodiments of optical processor 200, controller 250 may be any suitable controller capable of generating voltage or temperature to achieve a force necessary for a given level of actuation, to operate the individual grating elements in positive or negative PDL regimes in accordance with the above description.

Figure 3:
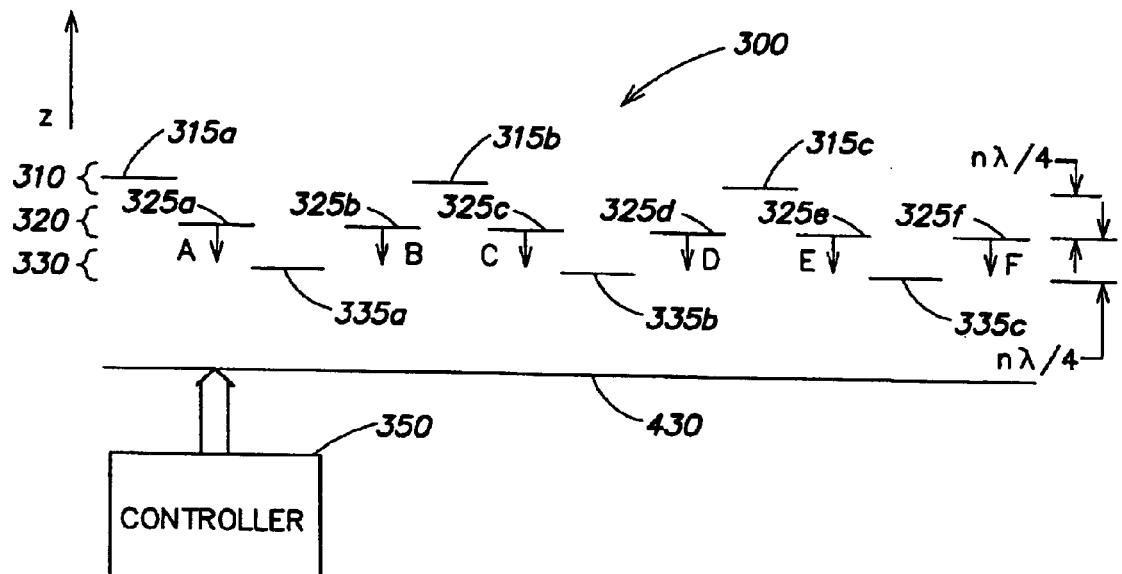
FIG. 3 is a schematic cross-sectional illustration of another exemplary embodiment of an optical processor according to at least some aspects of the present invention.

FIG. 3 is a schematic cross-sectional illustration of a second exemplary embodiment 300 of an optical processor according to at least some aspects of the present invention. Optical processor 300 includes a single pixel including twelve grating elements 315a–c, 325a–f, 335a–c. At the baseline position, the grating elements are at three levels; the reference grating elements 315 in upper level 310 and the reference grating elements 335 in lower level 330 are all separated from the operational grating elements 325 in middle level 320 by a multiple of a quarter-wavelength of the operational wavelength of light ($n\lambda/4$), where n is any non-zero integer). The integers n should be odd for the separation distances of both reference grating elements 315 and reference grating elements 335, or should both be even. Accordingly, in embodiments where the value of n for reference grating elements 315 is equal to the value of n for the grating elements 335, the grating elements 315 and 335 will be separated by an integer multiple of half the wavelength of light ($n\lambda/2$).

It is to be appreciated that, although the present embodiment is illustrated having a pixel with twelve grating elements, a pixel according to this aspect of the invention may include any integer multiple of four grating elements. For example, a four-element pixel includes two operational grating elements and two reference grating elements.

In embodiment 300, by actuating elements 325 in the manner shown by the arrows A–F (i.e., in the same direction), a given amount of diffraction can be achieved while maintaining a low PDL. The distances in the direction of the z-axis between grating elements 315 and 325 form gaps corresponding to PDLs of a sign (e.g., positive PDLs), and the distances between grating elements 325 and 335 form gaps corresponding to PDLs of the opposite sign (e.g., negative PDLs). In one embodiment, the operational areas of the grating elements 315, 325, 335 are equal to one another; therefore, the sum of the positive PDL contributions is substantially equal to the sum of the negative PDL contributions, and the overall PDL of the pixel is substantially zero. Although the grating elements 325 are illustrated as being actuated toward a substrate 430, in some embodiments grating elements may be actuated away from the substrate 430 using techniques as described above.

It is to be appreciated that although embodiment 300 was discussed as having grating elements 325 as the operational grating elements and grating elements 315, 325 as the reference elements, alternatively, grating elements 325 may be reference elements and grating elements 315 and 335 may be the operational elements. In such embodiments, grating elements 315 and 335 are moved relative grating element 325, in the same direction as one another, to achieve a given amount of diffraction. A diffraction grating so configured also would provide a low PDL in accordance with the present invention.

Controller 350 is any controller that is capable of generating actuation forces necessary to achieve a given level of actuation of appropriate grating elements 315, 325, 335, to operate the individual grating elements as taught herein.

Figure 4:
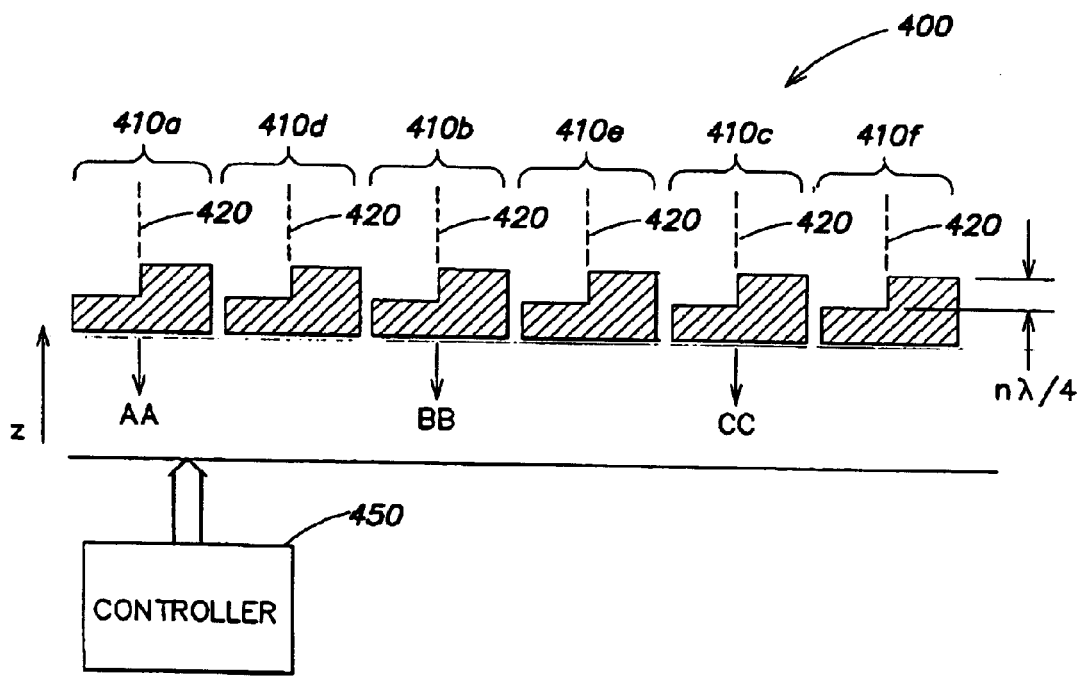
FIG. 4 is a schematic cross-sectional illustration of yet another exemplary embodiment of an optical processor according to at least some aspects of the present invention.

FIG. 4 is a schematic cross-sectional illustration of another exemplary embodiment of an optical processor 400 having one pixel. In FIG. 4, each grating element 410a–f has a step at its centerline line 420, the step having a height equal to any non-zero integer multiple of $\lambda/4$. Accordingly, when every other grating element is actuated in the manner shown by arrows AA, BB, and CC, for light incident normal to the top surface, the attenuation of the reflected beam will be modified while maintaining a low PDL.

An optical processor according to this embodiment has reference grating elements 410d–f and actuatable grating elements 410a–c, each element having a step at its centerline. Although optical processor 400 was discussed as having a pixel with six grating elements, each having a step at its centerline, the present embodiment may alternatively be viewed as a pixel having twelve grating elements, with two adjacent grating elements connected together and separated by a fixed distance equal to $\lambda/4$ so that the adjacent grating elements are actuated in the same direction and by the same amount. According to such a description, the pixel has twelve elements. It is to be appreciated that, although the present embodiment is illustrated with six grating elements in a pixel, pixels having any integer multiple of two grating elements are within the scope these teachings.

Controller 450 may be any controller that is capable of generating actuation forces necessary to achieve a given level of actuation of appropriate grating elements 410a–f, to operate the individual grating elements in accordance with the present exemplary embodiment.

Figure 5:
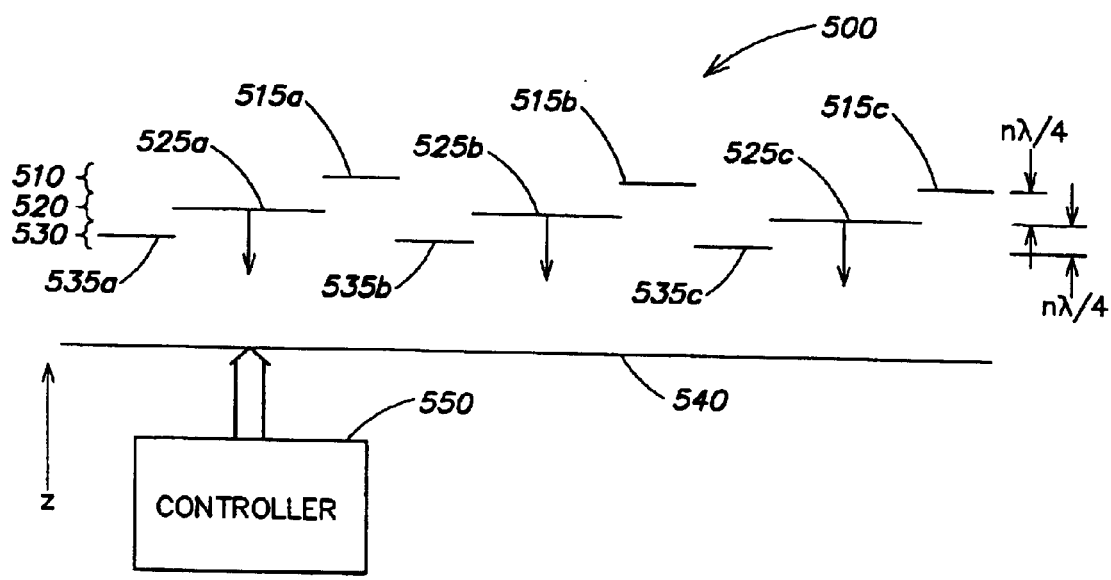
FIG. 5 is a schematic cross-sectional illustration of still another exemplary embodiment of an optical processor according to at least some aspects of the present invention.

FIG. 5 is a schematic cross-sectional illustration of another exemplary embodiment 500 of an optical processor according to at least some aspects of the present invention.

Optical processor 500 has one pixel including nine grating elements 515a–c, 525a–c, 535a–c. At the baseline position, the grating elements are at three levels; the elements 515 in upper level 510 and the elements 535 in lower level 530 are separated from the elements 525 in middle level 520 by gaps equal to a non-zero integer multiple of a quarter-wavelength of the operational light ($n\lambda/4$) (i.e., grating elements 515 and 535 are separated by $n\lambda/2$, where n is any non-zero integer). The integers n should be odd for the separation distances of both reference grating elements 515 and reference grating elements 535, or should both be even. Accordingly, in embodiments where the value of n for reference grating elements 515 is equal to the value of n for the grating elements 535, the grating elements 515 and 535 will be separated by an integer multiple of half the wavelength of light ($n\lambda/2$).

Although the present embodiment is illustrated with nine grating elements in a pixel, pixels having any integer multiple of three grating elements are within the scope of the teachings of this embodiment. For example, a three-element pixel includes one mid-level element 525, one upper-level element 515 and one lower-level element 535.

In the illustrated exemplary embodiment 500, by maintaining grating elements 515 and grating elements 535 stationary and by actuating elements 525 in the manner shown by the arrows X, Y and Z, a given amount of diffraction can be achieved while maintaining a low PDL. The distances between grating elements 515 and 525 (i.e., the gaps) correspond to PDLs of a sign, and the distances between grating elements 525 and 535 (i.e., the gaps) correspond to PDLs of the opposite. In one embodiment, the operational areas of each of grating element 515 and 535 are equal, and the operational areas of each of grating elements 525 is equal to twice the operational areas of each of grating elements 515 and grating elements 535; therefore, the sum of the positive PDL contributions is substantially equal to the sum of the negative PDL contributions, and the overall PDL of the pixel is substantially zero.

It is to be appreciated that actuation could also be achieved by moving the elements 525 in an upward direction. Alternatively, the elements 515 and 535 can be moved while keeping the elements 525 fixed; in such an embodiment, the elements 515, 535 in a pixel are all moved in the same direction, either up or down. It is also to be appreciated that an aspect of this embodiment is the relative movement of element 525 with respect to the elements 515, 535 to maintain a reduced PDL relative to a conventional diffraction grating, as described above, by operating the grating elements in regimes of positive PDL and negative PDL. It is a matter of design choice which elements to move and in which direction. The separation between elements 515 and 535 can be maintained by controller 550 or the separation may be structurally fixed (e.g., the elements 515 and 535 may be manufactured to be at different heights relative substrate 540).

Controller 550 may be any controller that is capable of generating actuation forces necessary to achieve a given level of actuation of appropriate grating elements 515, 525, 535, to operate the individual grating elements in accordance with the present exemplary embodiment.

Figure 6:
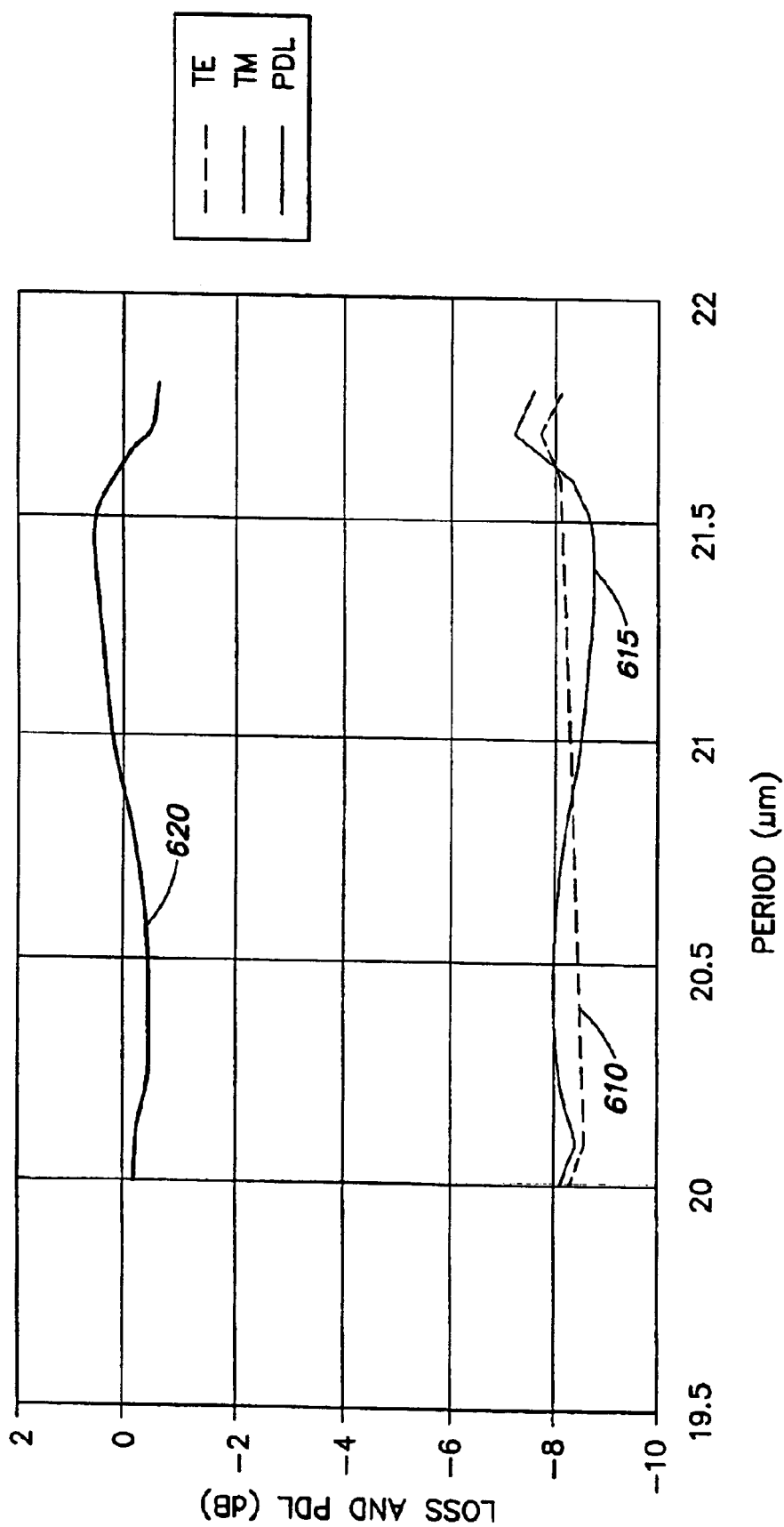
FIG. 6 is a plot of loss of TE polarized light, loss of TM polarized light and the corresponding PDL, each plotted versus the diffraction grating period.

FIG. 6 is a plot 610 of calculated power loss of TE and a plot 615 of calculated power loss of TM and the corresponding PDL 620, each plotted versus the grating period. The plots were calculated using the software package "G-solver." (The grating period is equal to two times the grating element width.) The plots correspond to a three-level design (e.g., optical processor 300 in FIG. 3), in which uppermost and lowermost beams are separated by one wavelength, and are 0.9 micrometer thick beams, in which the beams are actuated to produce 8 dBs of attenuation of a beam of light projected normally to the grating. In FIG. 6, a PDL equal to zero is achieved for periods of 20.9 micrometers and 21.6 micrometers, and the PDL of substantially zero is achieved for the other periods.

Figure 7:
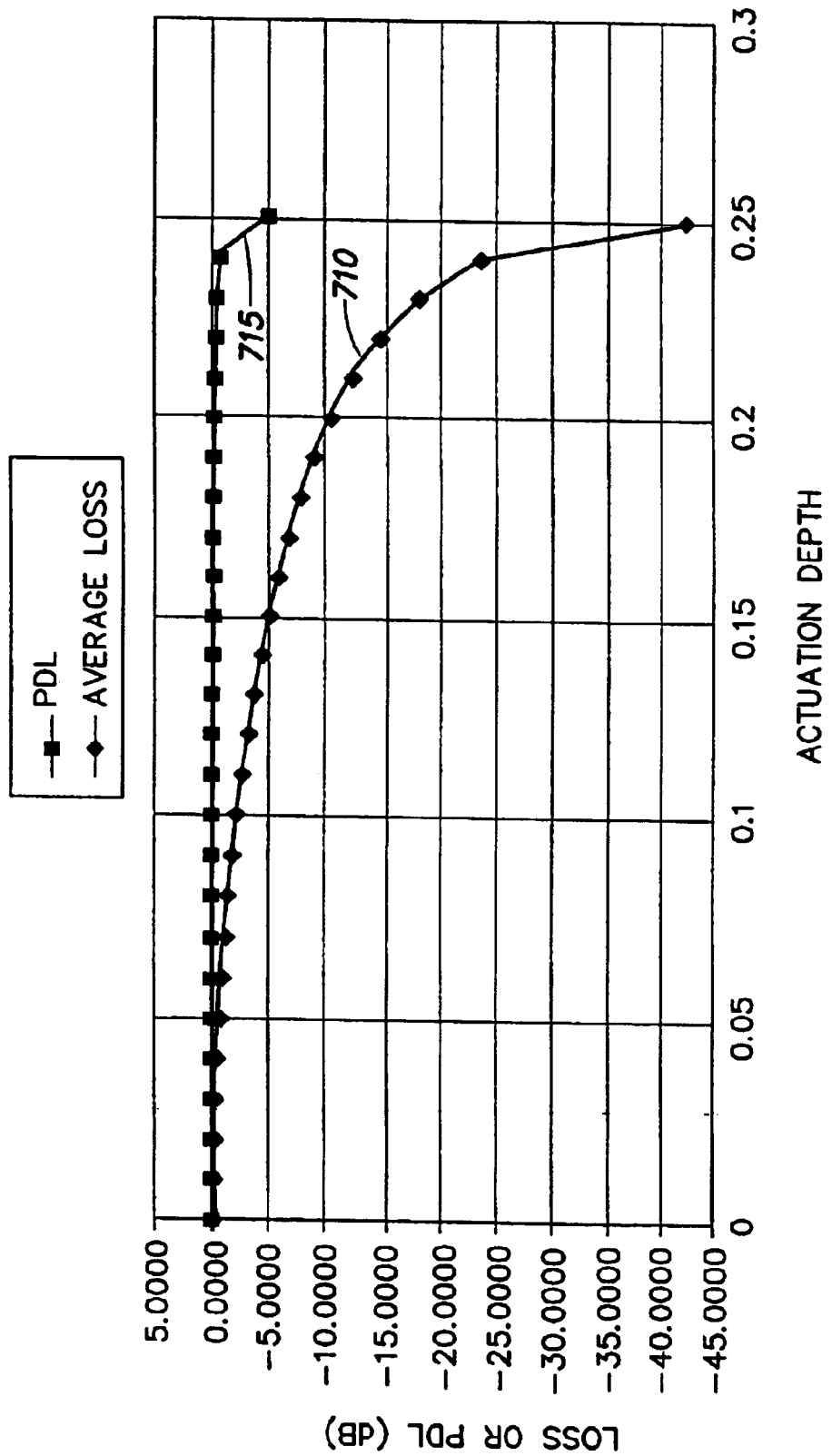
FIG. 7 is a graphical representation of attenuation (i.e., diffraction out of the zeroth order and into a non-zeroth order) as a function of actuation depth resulting from actuation of the optical processor of FIG. 3.

FIG. 7 is a graphical representation 710 of calculated attenuation (i.e., diffraction out of the zeroth order and into a non-zero order) as a function of actuation depth (i.e., change in relative distance of the levels) resulting from actuation of an optical processor 300 according to FIG. 3, for a beam of light projected normally to the grating. The plots of FIG. 7 were calculated using the software package "G-solver." FIG. 7 also includes a graphical representation of PDL 715 as a function of actuation depth. The plots in FIG. 7 correspond to an optical processor having a period of 35 microns, a spacing between the uppermost and lowermost level that is equal to $\lambda$, and no spacing between adjacent grating elements in the x-dimension.

It is to be appreciated that the ability of a diffraction grating to achieve low PDL values at actuation states corresponding to both maximum reflection (i.e., maximum throughput) of the zeroth order and maximum attenuation (i.e., minimum throughput) of the zeroth order is indicative of the ability of the device to achieve a high dynamic range. In FIG. 7, the achievable dynamic range extends from substantially full transmission (i.e., zero loss at 0 actuation depth) to substantially full attenuation (i.e., 45 dB of loss at an actuation depth equal to a quarter wavelength of the operation wavelength). Substantially full attenuation corresponds to a state where there is nearly full diffraction out of the zeroth order and into non-zero orders.

A grating for use with the present invention can be made using any suitable, now known or later-developed method of making a MEMS diffraction grating. For example, the grating of the present application can be made according to methods of co-pending application Ser. No. 09/975,169, entitled Actuatable Diffractive Optical Processor, to E. Deutsch et al., the disclosure of said application was incorporated by reference herein above. In particular, according to one exemplary embodiment, the optical processor of FIG. 2 can be made according to copending application Ser. No. 09/975,169. In one embodiment, the optical processor of FIG. 2 is made according to the steps of FIGS. 7a–7i of said application, the optical processor having twelve grating elements. A controller (as shown in FIG. 2) may be coupled to such an optical processor to control the grating elements in a manner as described above, using any known technique to position the grating elements to achieve reduced PDL.

In an alternative exemplary embodiment, the optical processor may be made in accordance with FIG. 3 of said co-pending application, in which lower mirror suspension structures of the diffraction grating are omitted, and the lower mirror surfaces are formed directly on a substrate. In another alternative embodiment, all of mirror suspension structures are upper mirror suspension structures according to FIG. 3 of said application, so all of the mirror surfaces are actuatable, and all of the mirror surfaces are coplanar.

The methods of operation of grating elements to provide reduced PDL, as described herein can be applied to any known actuatable grating structure. For example, the methods of operation taught herein can be applied to the grating structure described in U.S. Pat. No. 5,311,360, issued to Bloom et al.

The optical processors shown herein can be operated in a telecommunications system. For example, such optical processors can be operated in a system such as the systems described in FIGS. 9 and 10 of copending application Ser. No. 09/975,169.

Figure 8:
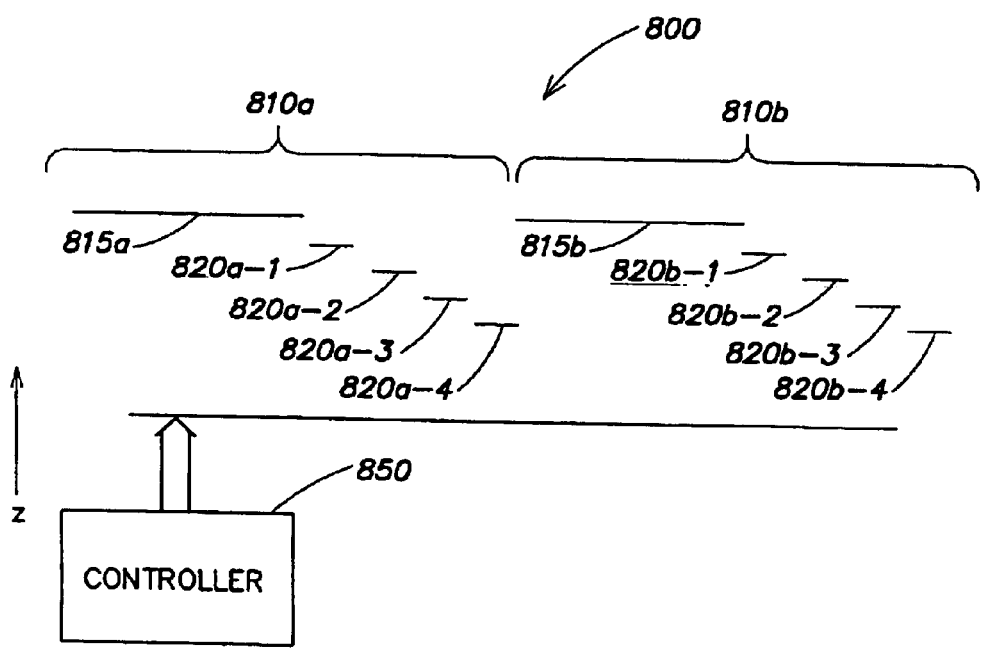
FIG. 8 is a schematic cross-sectional illustration of another exemplary embodiment of an optical processor having two pixels, each having one reference grating element and four adjacent operational grating elements.

FIG. 8 is another exemplary embodiment of an optical processor 800 having two pixels 810a, 810b each pixel having one reference grating element (815a, 815b, respectively) and four operational grating elements (820a-1 through 820a-4 and 820b-1 through 820b-4, respectively). The operational elements 820 of each pixel are adjacent one another.

A given pixel 810 is operated such that at least one operational element 820 in the pixel is operated to form a gap with reference grating element 815, which corresponds to a positive PDL, and at least one operational element 820 is operated to form a gap with reference grating element 815 which corresponds to a negative PDL regime. It is to be appreciated that each of operational elements 820 forms a gap in the direction of the z-axis relative to reference grating element 815, regardless of whether it is adjacent to reference grating element 815. In one embodiment, the sum of the areas of the reference element of a pixel is equal to the areas of the operational element of the pixel.

While the pixels are illustrated having four operational elements 820, any number of adjacent operational elements including two or greater can be used. It is to be appreciated that in embodiments where the operational elements 820 are adjacent to one another, as the widths of the reference grating elements 815 is increased, the diffraction efficiency of the pixel may be reduced.

Controller 850 may be any controller that is capable of generating actuation forces necessary to achieve a given level of actuation of appropriate grating elements 815, 820, to operate the individual grating elements in positive or negative PDL regimes in accordance with the present exemplary embodiment.

FIG. 9a is cross-sectional side view of an embodiment of an unactuated, electrostatically-actuatable diffraction grating 900 according to at least some aspects of the invention. In diffraction grating 900, an auxiliary beam 910 (i.e., the grating element) is displaced away from substrate 960 in the direction of axis-z as electrostatic actuation of actuation beam 920 increases. Actuation away from substrate 960 is in contrast to conventional electrostatically-actuated structures in which increased actuation results in displacement of a grating element toward the substrate.

Support posts 919 provide separation between electrodes 915 and an actuation beam 920. In diffraction grating 900, a voltage is applied between electrodes 915 and an actuation beam 920 to actuate optical processor 900, as illustrated in FIG. 9b below.

A lever beam 930 is coupled to actuation beam 920 via support post 929 and coupled to substrate 960 by support post 928. Auxiliary beam 910 is coupled to lever beam 930 via support posts 909. Accordingly, lever beam 930 and support posts 928, 929 form a lever structure, such that when actuation beam 920 is actuated in the direction of substrate 960 by establishing an electrostatic force between actuation beam 920 and electrodes 915, lever beam 930 is pivoted about pivot region 950, and auxiliary beam 910 is displaced away from substrate 960 by post 909.

The term "pivot" is intended to include any suitable technique of pivoting, including movement resulting in the generation of a rotational stress in a region of lever beam 930 and/or in a region of support post 928, the stress being capable of allowing lever beam 930 to operate as a lever. In some embodiments, lever beam 930 and support posts 928, 929 form a structure that provides a mechanical advantage in lifting auxiliary beam 910 away from substrate 960.

FIG. 9b is cross-sectional view of optical processor 900 in an actuated state. In FIG. 9b, actuation beam 920 is displaced toward substrate 960 in the direction of axis-z. Accordingly, lever beam 930 is pivoted about pivot region 950, and auxiliary beam 910 is displaced away from substrate 960.

Figure 10A:
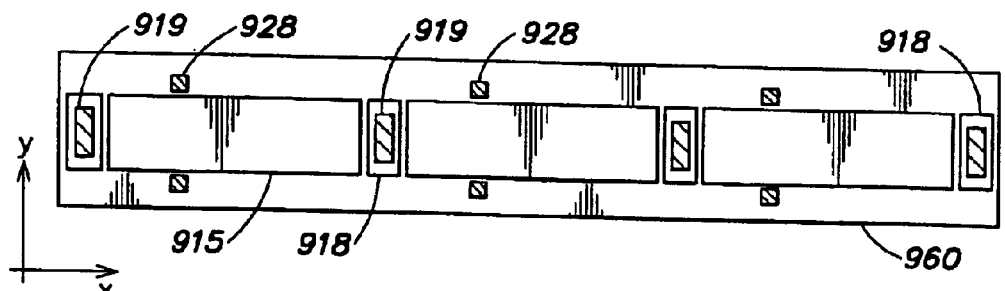
FIG. 10a is a cross-sectional, top view of the optical processor of FIG. 9a taken along line 10a–10a′.

FIGS. 10a–d are cross-sectional top views of optical processor 900 of FIG. 9a. FIG. 10a is taken along line 10a–10a' of FIG. 9a and illustrates posts 919, posts 928, electrodes 915, and insulator layer 918. Posts 919, 928 and electrodes 915 are formed of a deposited layer of polysilicon. Electrodes 915 are doped, so as to be electrically conducting. Insulator layer 918 is an optional layer that provides insulation of post 919 from substrate 960. For example, insulator layer 918 may be made of silicon oxide or silicon nitride.

Figure 10B:
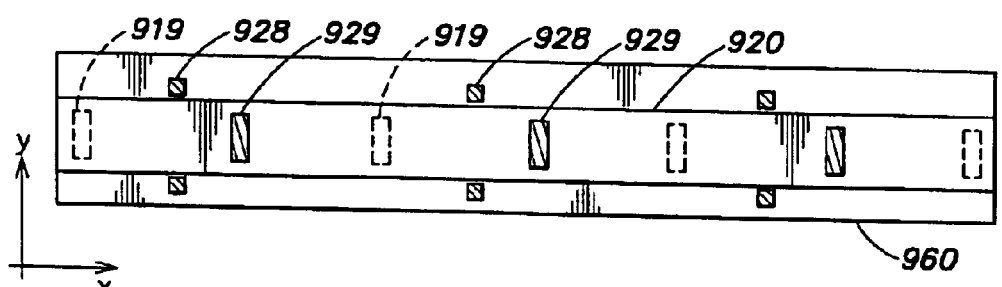
FIG. 10b is a top view of the optical processor of FIG. 9a taken along line 10b–10b′.

FIG. 10b is a top view of optical processor 900 taken along line 10b–10b' of FIG. 9a and illustrates actuation beam 920 and posts 928, 929. Posts 919 are visible through actuation beam 920 and are included for clarity. Posts 929 and actuation beam 915 are formed of polysilicon. Actuation beam 915 is doped so that it is electrically conducting.

Figure 10C:
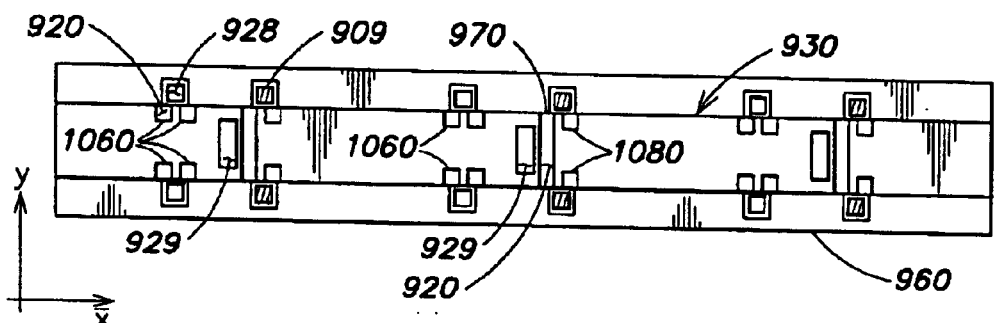
FIG. 10c is a top view of the optical processor of FIG. 9a taken along line 10c–10c′.

FIG. 10c is a top view of optical processor 900 taken along line 10c—10c of FIG. 9a and illustrates lever beams 930. Gaps 970 are the spaces between lever beams 930. Lever beams 930 are formed to include (i.e., surround) post 928 to form pivot region 950. Alternatively, lever beams 930 can be formed to overlay post 928 to form pivot region 950. Lever beams 930 are also formed to include posts 909 to attach lever beam 930 to auxiliary beam 910 (visible in FIG. 10d). Lever beams 930 are formed to have notches 1060 (i.e., lever beam 930 is narrowed in both the y-direction and the x-directions) to facilitate pivoting of the lever beam at pivot region 950 (visible in FIG. 9a). Therefore, actuation beam 920 of FIG. 10b is exposed at notches 1060.

Lever beams 930 are also formed to have notches 1080 to facilitate pivoting of the lever beam at post 909. Actuation beam 920 of FIG. 10b is exposed at notches 1080). Posts 929 are visible through lever beam 930 and are included for clarity.

Figure 10D:
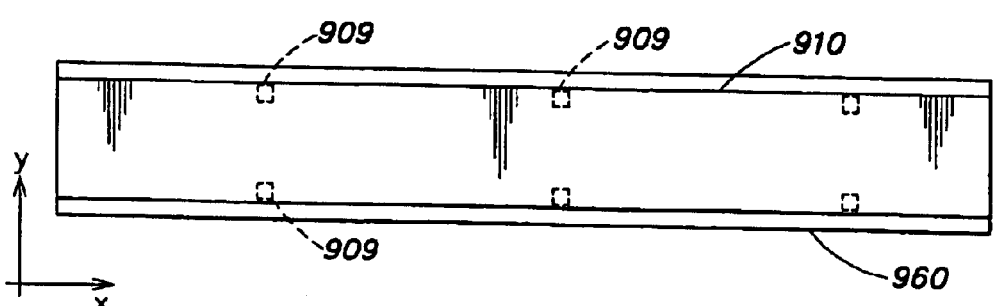
FIG. 10d is a top view of the optical processor of FIG. 9a taken along line 10d–10d′.

FIG. 10d is a top view of optical processor 900 taken along line 10d–10d' of FIG. 9a and illustrates auxiliary beam

910. In the illustrated exemplary embodiment, auxiliary beam 910 is wider in the y-direction than actuation beam 920 (shown in FIG. 9*b*) and lever beam 930 (shown in FIG. 9*c*). Posts 909 are visible through auxiliary beam 910 and are included for clarity. Auxiliary beam 910 is formed of polysilicon. A reflective surface (not shown) can be deposited on auxiliary beam 910. The reflective surface can be formed of aluminum, for example.

Figure 11:
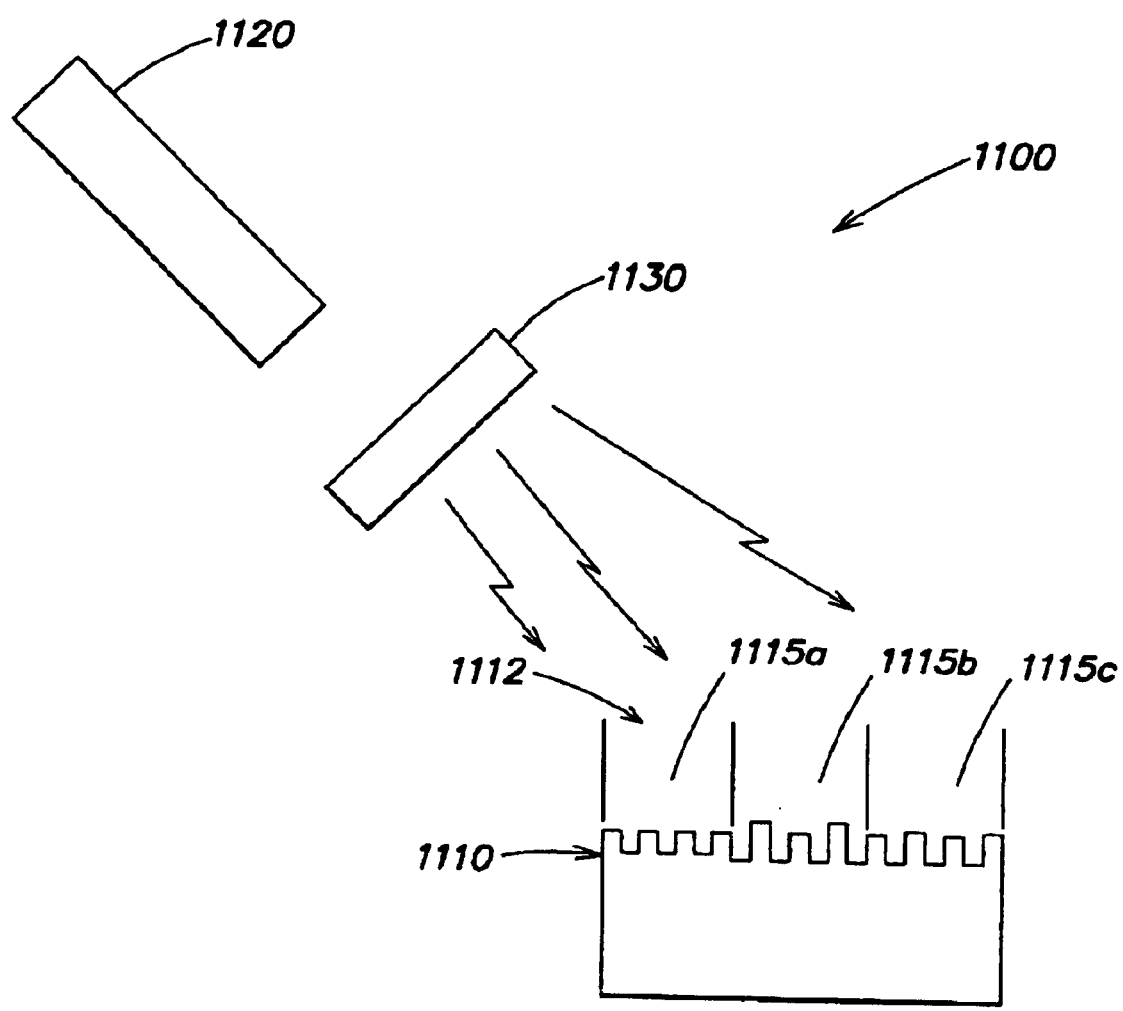
FIG. 11 is optical system according to the present invention having a fixed grating according to an aspect of the present invention.

FIG. 11 is optical system 1100 according to the present invention having a fixed grating 1110 according to an aspect of the present invention. Fixed diffraction grating 1110 has non-actuatable grating elements 1112. Optical system 1100 includes an optical source 1120 providing light having at least one wavelength, which is projected onto fixed grating 1110.

Source 1120 may be a monochromatic source, or may provide a plurality of wavelengths (e.g., the source may be an optical fiber carrying a wavelength-division multiplexed signal). In embodiments in which the source provides a plurality of wavelengths, a spectral separation device 1130 may be used to spatially separate the wavelengths such that they impinge on separate regions (i.e., pixels) 1115*a*–1115*c* of diffraction grating 1110. The source may provide wavelengths in telecommunications bands having wavelengths 820 nm–1620 nm. For example, the wavelengths may be in the C-band (1520 nm–1560 nm), the L-band (1561 nm–1720 nm) or in the band 820 nm–900 nm.

Because grating elements 1112 are fixed, diffraction grating 1110 provides a fixed amount of attenuation for the light. The pixels may be made according to any of the arrangements described (e.g., the arrangements described above with reference to FIGS. 2*a*, 3, 4, 5 and 8) herein to reduce PDL. In embodiments of diffraction grating 1110, having a plurality of pixels, different pixels, may be adapted to process different wavelengths of light (e.g., different channels of a telecommunication system) and to provide reduced (or substantially zero) PDL for the selected wavelengths of light, and/or to provide different amounts of attenuation for the different wavelengths.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. An optical processor characterized by an axis extending in a direction, the optical processor comprising:
    (a) a pixel to process light having a wavelength $\lambda$, comprising
        (1) a first grating element having a reflective surface, at least a portion of the reflective surface being disposed normal to a direction of the axis,
        (2) a second grating element, parallel to the first grating element and having a reflective surface, at least a portion of the reflective surface being disposed normal to the direction of the axis, and
        (3) a third grating element, parallel to the first grating element and having a reflective surface, at least a portion of the reflective surface being disposed normal to the direction of the axis; and
    (b) a controller operable to displace at least the reflective surface of the second grating element relative the reflective surface of the first grating element, a displacement of the reflective surface of the second grating element forming a first gap in the direction of the axis relative the reflective surface of the first grating element, the first gap corresponding to a PDL of a sign, and the reflective surface of the third grating element forming a second gap, relative one of the reflective surface of the first grating element and the reflective surface of the second grating element, in the direction of the axis and corresponding to a PDL of the opposite sign.

2. The optical processor of claim 1, wherein in a direction perpendicular to the axis, the second grating element is located intermediate the first grating element and the third grating element.

3. The optical processor of claim 2, wherein the first grating element and the third grating element are non-actuatable grating elements.

4. The optical processor of claim 3, wherein the reflective surface of the first grating element and reflective surface of the third grating element are separated by a distance, in the direction of the axis, equal to an integer multiple of $\lambda/2$.

5. The optical processor of claim 4, wherein the width of the reflective surface of the second grating element is equal to the sum of the widths of the reflective surface of the first grating element and the reflective surface of the third grating element.

6. The optical processor of claim 5, wherein the PDL of a sign and the PDL of an opposite sign have substantially the same magnitudes, whereby their sum is substantially zero.

7. The optical processor of claim 1, wherein the controller is operable to displace the third grating element relative the first grating element, and in a direction perpendicular the axis, the first grating element is located intermediate the second grating element and the third grating element.

8. The optical processor of claim 7, wherein the controller is operable to maintain the reflective surface of the second grating element and reflective surface of the third grating element in positions separated by a distance, in the direction of the axis, equal to an integer multiple of $\lambda/2$ during processing of the light, and wherein the controller is operable to displace the second grating element and the third grating element relative the first grating element during the processing of the light.

9. The optical processor of claim 8, wherein the width of the reflective surface of the first grating element is equal to the sum of the width of the reflective surface of the second grating element and the width of the reflective surface of the third grating element.

10. The optical processor of claim 9, wherein the PDL of a sign and the PDL of an opposite sign have substantially the same magnitudes, whereby their sum is substantially zero.

11. The optical processor of claim 1, wherein the controller is operable to displace the first grating element, and the third grating element.

12. The optical processor of claim 11, wherein in a direction perpendicular the axis, the first grating element is located intermediate the second grating element and the third grating element, and wherein the controller is operable to maintain the reflective surface of the second element and reflective surface of the third grating element in positions separated by a distance, along the axis, equal to an integer multiple of $\lambda/2$ during processing of the light, and to displace the reflective surface of the first grating element while the reflective surface of the second grating element and the reflective surface of the third element are maintained in said position.

13. The optical processor of claim 12, wherein the width of the reflective surface of the first grating element is equal to the sum of the widths of the reflective surface of the second grating element and the reflective surface of the third grating element.

14. The optical processor of claim 13, wherein the PDL of a sign and the PDL of an opposite sign have substantially the same magnitudes, whereby their sum is substantially zero.

15. The optical processor of claim 1, wherein the pixel further comprises a fourth grating element, parallel to the first grating element and having a reflective surface, at least a portion of the reflective surface normal to the direction of the axis, and wherein, in a direction normal to the axis, the grating elements are arranged in the following order, the first grating element, the second grating element, the fourth grating element and the third grating element.

16. The optical processor of claim 15, wherein first grating element and the fourth grating element are non-actuatable.

17. The optical processor of claim 16, wherein the first grating element and the fourth grating element are coplanar with one another.

18. The optical processor of claim 17, wherein the controller is operable to displace the second grating element and the third grating element, and wherein the PDL of a sign and the PDL of an opposite sign have substantially the same magnitudes, whereby their sum is substantially zero.

19. The optical processor of claim 15, wherein the controller is operable to maintain the reflective surface of the first grating element and the reflective surface of the fourth grating element in coplanar positions during processing of the light.

20. The optical processor of claim 17, wherein the controller is operable to displace the second grating element and the third grating element relative the first grating elements and the fourth grating element, and wherein the PDL of a sign and the PDL of an opposite sign have substantially the same magnitudes, whereby the sum of the PDL of a sign and the PDL of the opposite sign is substantially zero.

21. The optical processor of claim 15, wherein the reflective surface of the first grating element and the reflective surface of the fourth grating element are non-actuatable, and separated by an integer multiple of $\lambda/2$ along the axis.

22. The optical processor of claim 21, wherein the controller is operable to displace the reflective surface of the second grating element and the reflective surface of the third grating element during processing of the light, and wherein the PDL of a sign and the PDL of an opposite sign have substantially the same magnitudes during the processing of the light, whereby their sum is substantially zero.

23. The optical processor of claim 1, wherein the pixel further comprises a fourth grating element, parallel to the first grating element and having a reflective surface, at least a portion of the reflective surface normal to the direction of the axis, and wherein, in a direction normal to the axis, the grating elements are arranged in the following order, the first grating element, the fourth grating element, the second grating element and the third grating element.

24. The optical processor of claim 23, wherein the second grating element and the third grating element are connected together such that reflective surface of the second grating element and the reflective surface third grating element are separated by a distance equal to an integer multiple of $\lambda/2$ in the direction of the axis.

25. The optical processor of claim 24, wherein the controller is operable to displace the second grating element and third grating element along the axis, relative the first grating element and the third grating element, whereby the distance is maintained during displacement.

26. The optical processor of claim 25, wherein the reflective surface of the first grating element and the reflective surface of the fourth grating element are connected together such that reflective surface first grating element and the reflective surface of the fourth grating element are separated by a distance equal to an integer multiple of $\lambda/2$ in the direction of the axis.

27. The optical processor of claim 1, wherein the displacement is achieved using one of an electrostatic technique, a magnetic technique, a piezoelectric technique, and a thermal technique.

28. An optical processor to process light having a wavelength $\lambda$, characterized by an first axis extending in a direction, the optical processor comprising:

a first grating element having a length and a reflective surface, at least a portion of the reflective surface being disposed normal to a direction of the axis;

a second grating element, parallel to the first grating element and having a reflective surface, at least a portion of the reflective surface being disposed normal to the direction of the first axis, the second grating element connected to the first grating element such that in the direction of a second axis, which is perpendicular to both the length and the first axis, there is a first step equal in height to a non-zero integer multiple of $\lambda/4$ between the reflective surface of the first grating element and reflective surface of the second grating element;

a third grating element having a reflective surface, at least a portion of the reflective surface being disposed normal to a direction of the first axis; and a fourth grating element, parallel to the first grating element and having a reflective surface, at least a portion of the reflective surface being disposed normal to the direction of the first axis, the fourth grating element connected to the third grating element such that in the direction of the second axis there is a second step equal in height to a non-zero integer multiple of $\lambda/4$ between the reflective surface of the third grating element and reflective surface of the fourth grating element, the first grating element and the second grating element displaceable relative the third grating element and the fourth grating element, in the direction of the first axis;

whereby the first step and the second step are maintained in both actuated state and the unactuated state.

29. The optical processor of claim 28, further comprising an actuator to effect a displacement of the first grating element and the second grating element relative the third grating element and the fourth grating element, in the direction of the first axis.

30. The optical process or claim 28, wherein in an unactuated state, the reflective surface of the first grating element is coplanar with the reflective surface of the third grating element , and the reflective surface of second grating element is coplanar with the reflective surface of the fourth grating element.

31. The optical processor of claim 29, wherein the actuator is one of an electrostatic actuator, a magnetic actuator, a piezoelectric actuator, and a thermal actuator.

32. An optical processor to process light having a wavelength $\lambda$, characterized by an first axis extending in a direction, the optical processor comprising:

a first grating element having a reflective surface, at least a portion of the reflective surface being disposed normal to a direction of the axis;

a second grating element, parallel to the first grating element and having a reflective surface, at least a portion of the reflective surface being disposed normal to the direction of the first axis, the second grating element having a structurally fixed separation from the first grating element, along the first axis, equal to a non-zero integer multiple of $\lambda/4$; and a third grating element having a reflective surface, at least a portion of the reflective surface being disposed normal to a direction of the first axis, the third grating element displaceable relative the first grating element and second grating element.

33. The optical processor of claim 32, further comprising an actuator to effect a displacement of the first grating element and the second grating element relative the third grating element, in the direction of the first axis.

34. The optical processor of claim 32, wherein the first grating element and the second grating element are non-actuatable.

35. The optical processor of claim 32, wherein in a direction perpendicular the axis, the third grating element is located intermediate the first grating element and the second grating element.

36. The optical processor of claim 32, wherein the width of the reflective surface of the third grating element is equal to the sum of the widths of the reflective surface of the first grating element and the reflective surface of the second grating element.

37. The optical processor of claim 36, wherein the gap between the reflective surface of the first grating surface and the reflective surface of the third grating element, in the direction of the axis, corresponds to a PDL of a sign, and the gap between the reflective surface of the second grating element and the reflective surface of the third grating element, in the direction of the axis, corresponds to a PDL of the opposite sign, the PDL of a sign and the PDL of the opposite sign have substantially the same magnitudes, whereby their sum is substantially zero.

38. An optical system comprising:

(a) an optical source to produce a wavelength $\lambda$; and (b) a fixed diffraction grating characterized by an axis extending in a direction, the diffraction grating comprising a pixel configured to receive the wavelength $\lambda$, comprising (1) a first grating element having a reflective surface, at least a portion of the reflective surface being disposed normal to a direction of the axis, (2) a second grating element, parallel to the first grating element and having a reflective surface, at least a portion of the reflective surface being disposed normal to the direction of the axis, the reflective surface of the second grating element forming a first gap in the direction of the axis relative the reflective surface of the first grating element, the first gap corresponding to a PDL of a sign and (3) a third grating element, parallel to the first grating element and having a reflective surface, at least a portion of the reflective surface being disposed normal to the direction of the axis, the reflective surface of the third grating element forming a second gap, relative one of the reflective surface of the first grating element and the reflective surface of the second grating element, in the direction of the axis and corresponding to a PDL of the opposite sign.

39. The optical system of claim 38, wherein the wavelength is the band 820 nm–1620 nm.

40. A method of operating a pixel of an optical processor, characterized by an axis, the pixel having (a) a first grating element having a reflective surface supported above a substrate, at least a portion of the reflective surface normal to a direction of the axis, (b) a second grating element having a reflective surface supported above a substrate, at least a portion of the reflective surface normal to the direction of the axis, and (c) a third grating element having a reflective surface, a portion of the reflective surface normal to the direction of the axis, comprising:

positioning the reflective surface of the second grating element to form a first gap relative the reflective surface of the first grating element, the first gap corresponding to a PDL of a sign, the reflective surface of the third grating element forming a second gap relative one of the reflective surface of the first grating and the reflective surface of the second grating, the second gap corresponding to a PDL of the opposite sign.

41. The method of claim 40, wherein the PDL of a sign and the PDL of an opposite sign have substantially the same magnitudes, whereby their sum is substantially zero.

42. The method of claim 40, wherein the step of positioning includes increasing the first gap and decreasing the second gap.

43. The method of claim 40, wherein the step of positioning includes increasing the first gap and increasing the second gap.

44. The method of claim 40, wherein the pixel further comprises a fourth diffractive grating element having a reflective surface, at least a portion of the reflective surface normal to the direction of the axis, the method further comprising positioning the reflective surface of the third grating element such that the second gap corresponds to a PDL having the opposite sign.

45. The method of claim 44, wherein the pixel has a baseline position, and wherein the step of positioning the reflective surface of the second grating element includes moving away from the baseline position and toward the substrate, and the step of positioning reflective surface of the grating element includes moving away form the baseline position and away from the substrate.

46. The method of claim 44, wherein the pixel has a baseline position, and wherein the step of positioning the reflective surface of the second grating element includes moving away from the baseline position and toward the substrate, and the step of positioning reflective surface of the third grating element includes moving away form the baseline position and toward the substrate.

47. The method of claim 46, wherein the step of positioning the reflective surface of the second grating element increases the first gap and the step of positioning the reflective surface of the third grating element decreases the second gap.

48. The method of claim 40, wherein the step of positioning the reflective surface of the second grating element is achieved using one of an electrostatic technique, a magnetic technique, a piezoelectric technique, and a thermal technique.

* * * * *